US010086726B2

(12) United States Patent
Iwata et al.

(10) Patent No.: US 10,086,726 B2
(45) Date of Patent: Oct. 2, 2018

(54) SEAT HEATER CONTROL DEVICE USING ELECTROSTATIC SENSOR

(71) Applicant: MAZDA MOTOR CORPORATION, Hiroshima (JP)

(72) Inventors: Kengo Iwata, Hiroshima (JP); Masanobu Kosaka, Kure (JP); Mitsuhiro Yamoto, Higashihiroshima (JP); Kiyonobu Takahashi, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/397,213

(22) Filed: Jan. 3, 2017

(65) Prior Publication Data

US 2017/0210259 A1 Jul. 27, 2017

(30) Foreign Application Priority Data

Jan. 26, 2016 (JP) .................... 2016-012278

(51) Int. Cl.
*B60N 2/56* (2006.01)
*B60N 2/00* (2006.01)
(Continued)

(52) U.S. Cl.
CPC ............. *B60N 2/56* (2013.01); *B60N 2/002* (2013.01); *G01B 7/14* (2013.01); *G01D 5/241* (2013.01);
(Continued)

(58) Field of Classification Search
CPC . B60N 2/56; B60N 2/002; G01B 7/14; G01D 5/241; G01G 19/4142; G01L 1/142
See application file for complete search history.

(56) References Cited

U.S. PATENT DOCUMENTS 6,816,077 B1    11/2004 Shieh et al.
7,197,801 B2 *   4/2007 Bajic ................. B60N 2/56
                                                29/91
(Continued)

FOREIGN PATENT DOCUMENTS

JP    2002-347498 A    12/2002
JP    2008-220399 A     9/2008
(Continued)

OTHER PUBLICATIONS

An Office Action mailed by the Japanese Patent Office dated Dec. 25, 2017, which corresponds to Japanese Patent Application No. 2016-012278 and is related to U.S. Appl. No. 15/397,213; with partial English translation.

*Primary Examiner* — Philip F Gabler
(74) *Attorney, Agent, or Firm* — Studebaker & Brackett PC

(57) ABSTRACT

The seat heater control device is provided for a vehicle including a vehicle body, a vehicle seat and a seat heater. The seat heater control device includes: an electrostatic sensor provided in the vehicle seat and configured to measure capacitance between the electrostatic sensor and the vehicle body; and a controller configured to control an operation and/or an operational temperature of the seat heater, based on a measured value of the electrostatic sensor. The controller is configured to cause the seat heater to operate at a relative higher temperature when the measured value of the electrostatic sensor is higher than a first threshold and lower than a second threshold. The controller is configured to cause the seat heater to operate at a relative lower temperature when the measured value of the electrostatic sensor is higher than the second threshold.

7 Claims, 4 Drawing Sheets

(51) Int. Cl.
*G01B 7/14* (2006.01)
*G01D 5/241* (2006.01)
G01G 19/414 (2006.01)
G01L 1/14 (2006.01)

(52) U.S. Cl.
CPC .......... *G01G 19/4142* (2013.01); *G01L 1/142* (2013.01)

(56) References Cited

U.S. PATENT DOCUMENTS

| | | |
|---|---|---|
| 9,114,747 B2 * | 8/2015 | Aoki ..................... B60N 2/002 |
| 2004/0196150 A1 | 10/2004 | Shieh et al. |
| 2004/0199318 A1 | 10/2004 | Shieh et al. |
| 2006/0187038 A1 | 8/2006 | Shieh et al. |
| 2012/0312520 A1 * | 12/2012 | Hoke ................ B60H 1/00285 165/203 |
| 2013/0134745 A1 | 5/2013 | Aoki |
| 2013/0234736 A1 * | 9/2013 | Ootaka ............. G01R 27/2605 324/679 |
| 2015/0367751 A1 * | 12/2015 | Lamesch ................ B60N 2/002 297/180.12 |
| 2016/0272038 A1 * | 9/2016 | Tanaka ............... B60H 1/00285 |

FOREIGN PATENT DOCUMENTS

| | | |
|---|---|---|
| JP | 2012-035717 A | 2/2012 |
| JP | 2013-186036 A | 9/2013 |

* cited by examiner

001# SEAT HEATER CONTROL DEVICE USING ELECTROSTATIC SENSOR

TECHNICAL FIELD

The present invention relates to a seat heater control device configured to control an output of a seat heater by means of an electrostatic sensor.

BACKGROUND ART

The principle of an occupant detection device configured to detect whether or not there is a passenger in a vehicle by means of an electrostatic sensor (a capacitance sensor) is explained with reference to FIG. 4. As shown in FIG. 4, an electrostatic sensor 51 that measures capacitance between the electrostatic sensor 51 and a vehicle body 52 is buried in a vehicle seat 53. If a passenger sits on the vehicle seat 53, the capacitance between the electrostatic sensor 51 and the vehicle body 52 is increased, depending on relative dielectric constant of the passenger (human being), compared with the case wherein no passenger sits on the vehicle seat 53. Based on this principle, it is possible to judge whether or not there is a passenger on the vehicle seat 53.

JP-A-2013-186036 has proposed an occupant detection device for a vehicle, which uses the above principle and which achieves accurate detection at low cost even when some liquid is poured (applied) on the vehicle seat or some moisture is absorbed by the vehicle seat. The occupant detection device can achieve the accurate detection by changing the criterion of judgment by taking into account the humidity of environment.

The result of the detection (judgment) is used for another judgment, such as whether an air bag should be activated at a collision accident, or whether a warning about fastening of the seat belt should be issued.

In addition, a seat heater having a heating element may be buried in the vehicle seat 53 in order to warm the hip of a passenger sitting on the vehicle seat 53. The operation of the seat heater may have effects on the measured value of the electrostatic sensor 51. Technique for removing the effects is disclosed in JP-A-2012-035717.

Patent Document List

1. JP-A-2013-186036
2. JP-A-2012-035717

SUMMARY OF INVENTION

Technical Problem

Herein, when an ample (heavy) passenger sits on the vehicle seat 53, the cushion of the vehicle seat 53 is compressed, so that the distance between the seat heater and the hip of the passenger is shortened. Thus, the temperature of the surface of the vehicle seat 53 is increased too much, compared with a case wherein a normal passenger sits on the vehicle seat 53.

In addition, as seen from the principle explained with reference to FIG. 4, the capacitance between the electrostatic sensor 51 and the vehicle body 52 is affected by the relative dielectric constant of the passenger (human being). Thus, the measured value of the capacitance may differ between a big passenger whose sitting height (usually in close relationship with height) is high and a small passenger whose sitting height is low (for example, a child). By using this matter, it is possible to judge not only whether or not there is a passenger on the vehicle seat 53, but also whether the passenger on the vehicle seat 53 is big or small.

Furthermore, in general terms, a big passenger is heavy, so that the cushion of the vehicle seat 53 is compressed to a large extent, and a small passenger is light, so that the cushion of the vehicle seat 53 is compressed to a small extent.

The present invention was made based on the above background. The object of the present invention is to provide a seat heater control device configured to control an output of a seat heater effectively, by judging whether a passenger on a vehicle seat is a big and heavy person or a small and light person, by means of an electrostatic sensor.

Solution to Problem

The present invention is a seat heater control device provided for a vehicle, the vehicle including a vehicle body, a vehicle seat and a seat heater, the seat heater control device comprising: an electrostatic sensor provided in the vehicle seat and configured to measure capacitance between the electrostatic sensor and the vehicle body; and a controller configured to control an operation and/or an operational temperature of the seat heater, based on a measured value of the electrostatic sensor; wherein the controller is configured to cause the seat heater to operate at a relative higher temperature when the measured value of the electrostatic sensor is higher than a first threshold and lower than a second threshold, and the controller is configured to cause the seat heater to operate at a relative lower temperature when the measured value of the electrostatic sensor is higher than the second threshold.

According to the present invention, when the measured value of the electrostatic sensor is higher than the first threshold and is lower than the second threshold, it is judged that a passenger is sitting on the vehicle seat and the passenger is a small and light person, i.e., it is judged that a cushion of the vehicle seat is compressed to a small extent, so that the seat heater is caused to operate at a relative higher temperature. On the other hand, according to the present invention, when the measured value of the electrostatic sensor is higher than the second threshold, it is judged that a passenger is sitting on the vehicle seat and the passenger is a big and heavy person, i.e., it is judged that a cushion of the vehicle seat is compressed to a large extent, so that the seat heater is caused to operate at a relative lower temperature.

In the present invention, it is preferable that the seat heater control device further comprises a distance measuring unit configured to measure a distance between a sitting surface of the vehicle seat and the seat heater, wherein the controller is configured to adjust the operational temperature of the seat heater based on a measurement value of the distance measuring unit.

According to the conventional art, when a cushion of the vehicle seat becomes thinner than its original shape due to the loss of its restoring force and thus the distance between the seat heater and the hip of the passenger is shortened, the temperature of the surface of the vehicle seat is increased too much, compared with the situation before the vehicle seat becomes thinner. If the operational temperature of the seat heater is adjusted based on the measured value of the distance measuring unit, such a problem can be removed.

Any type of distance measuring unit can be adopted. In view of space-saving, preferably, the electrostatic sensor is located in a vicinity of the sitting surface of the vehicle seat and also configured to serve as the distance measuring unit. In this case, when the electrostatic sensor judges whether or not there is a passenger on the vehicle seat as well as whether the passenger on the vehicle seat is big or small, preferably, the power supply to the seat heater is stopped, as described in JP-A-2012-035717. When the electrostatic sensor measures the distance between the sitting surface of the vehicle seat and the seat heater, the capacitance is measured while the power supply to the seat heater is continued. In advance, respective values of the capacitance are associated with respective distances to obtain a relationship therebetween through an experiment or the like. The distance is determined by the measured capacitance and the relationship.

This feature can be expressed as follows. That is to say, the present invention is a seat heater control device provided for a vehicle, the vehicle including a vehicle body, a vehicle seat and a seat heater, the seat heater control device comprising: an electrostatic sensor provided in the vehicle seat and configured to measure capacitance between the electrostatic sensor and the seat heater; and a controller configured to control an operation and/or an operational temperature of the seat heater, based on a measured value of the electrostatic sensor; wherein the controller is configured to cause the seat heater to operate at a relative higher temperature when the measured value of the electrostatic sensor is lower than a threshold, and the controller is configured to cause the seat heater to operate at a relative lower temperature when the measured value of the electrostatic sensor is higher than the threshold.

Advantageous Effects of Invention

According to the present invention, when the measured value of the electrostatic sensor is higher than the first threshold and is lower than the second threshold, it is judged that a passenger is sitting on the vehicle seat and the passenger is a small and light person, i.e., it is judged that a cushion of the vehicle seat is compressed to a small extent, so that the seat heater is caused to operate at a relative higher temperature. On the other hand, according to the present invention, when the measured value of the electrostatic sensor is higher than the second threshold, it is judged that a passenger is sitting on the vehicle seat and the passenger is a big and heavy person, i.e., it is judged that a cushion of the vehicle seat is compressed to a large extent, so that the seat heater is caused to operate at a relative lower temperature.

DESCRIPTION OF EMBODIMENTS

Hereinafter, with respect to the attached figures, an embodiment of the present invention is explained.

Figure 1:
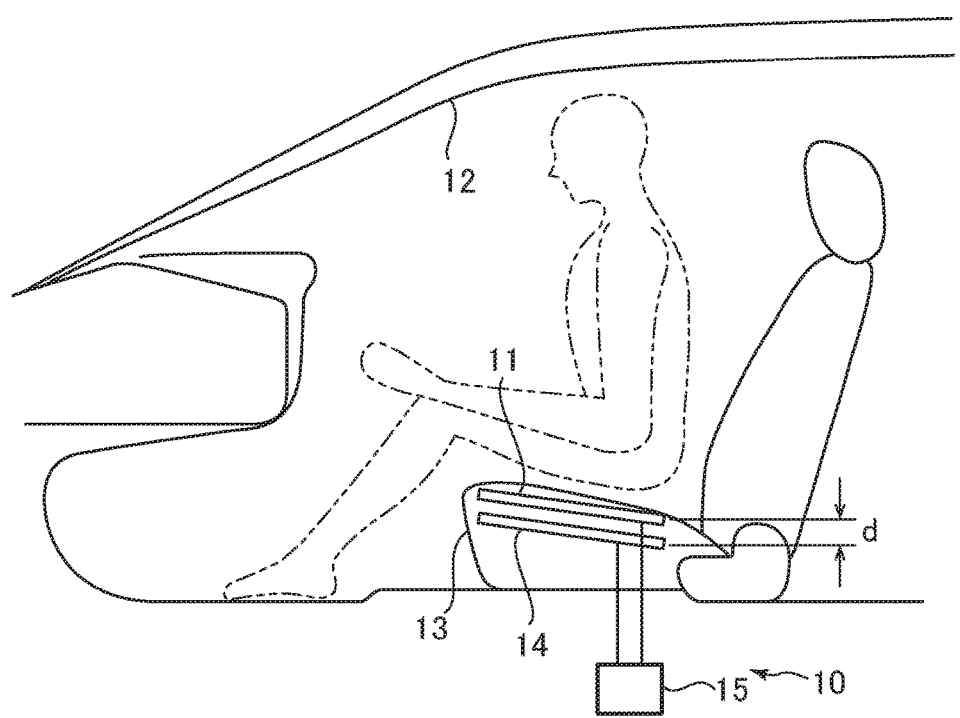
FIG. 1 is a schematic view showing a seat heater control device according to an embodiment of the invention.

FIG. 1 shows a vehicle interior of a car, in which a seat heater control device 10 according to an embodiment of the present invention is provided. As shown in FIG. 1, in general, the vehicle seat 13 has a main seat on which a passenger can sit, and a backrest on which the passenger can settle back. The electrostatic sensor 11 is provided (buried) inside the seat 13 in order to measure capacitance between the electrostatic sensor 11 and the vehicle body 12. Specifically, the electrostatic sensor 11 is arranged between a seat cover for the main seat and a seat cushion of the main seat. That is to say, the electrostatic sensor 11 is arranged in a vicinity of the seat cover (in a vicinity of the sitting surface).

Various types of known electrostatic sensors are useable as the electrostatic sensor 11. For example, the electrostatic sensor 11 has a main electrode having a substantially flat shape for measuring capacitance between itself and the vehicle body 12, and a sensor circuit.

On the other hand, a seat heater 14 having a heating element is provided in the seat cushion of the vehicle seat 13 in order to warm the hip of a passenger sitting on the vehicle seat 13.

The seat heater control device 10 according to the present embodiment has a controller 15 configured to control an operation and/or an operational temperature of the seat heater 14, based on a measured value of the electrostatic sensor 11.

According to the present embodiment, when the measured value of the electrostatic sensor 11 is higher than a predetermined first threshold and is lower than a predetermined second threshold, the controller 15 judges that a passenger is sitting on the vehicle seat 13 and the passenger is a small and light person, i.e., the controller 15 judges that the seat cushion of the vehicle seat 13 is compressed to a small extent, and thus causes the seat heater 14 to operate at a relative higher temperature.

On the other hand, according to the present embodiment, when the measured value of the electrostatic sensor 11 is higher than the predetermined second threshold, the controller 15 judges that a passenger is sitting on the vehicle seat 13 and the passenger is a big and heavy person, i.e., the controller 15 judges that the seat cushion of the vehicle seat 13 is compressed to a large extent, and thus causes the seat heater 14 to operate at a relative lower temperature.

Figure 2:
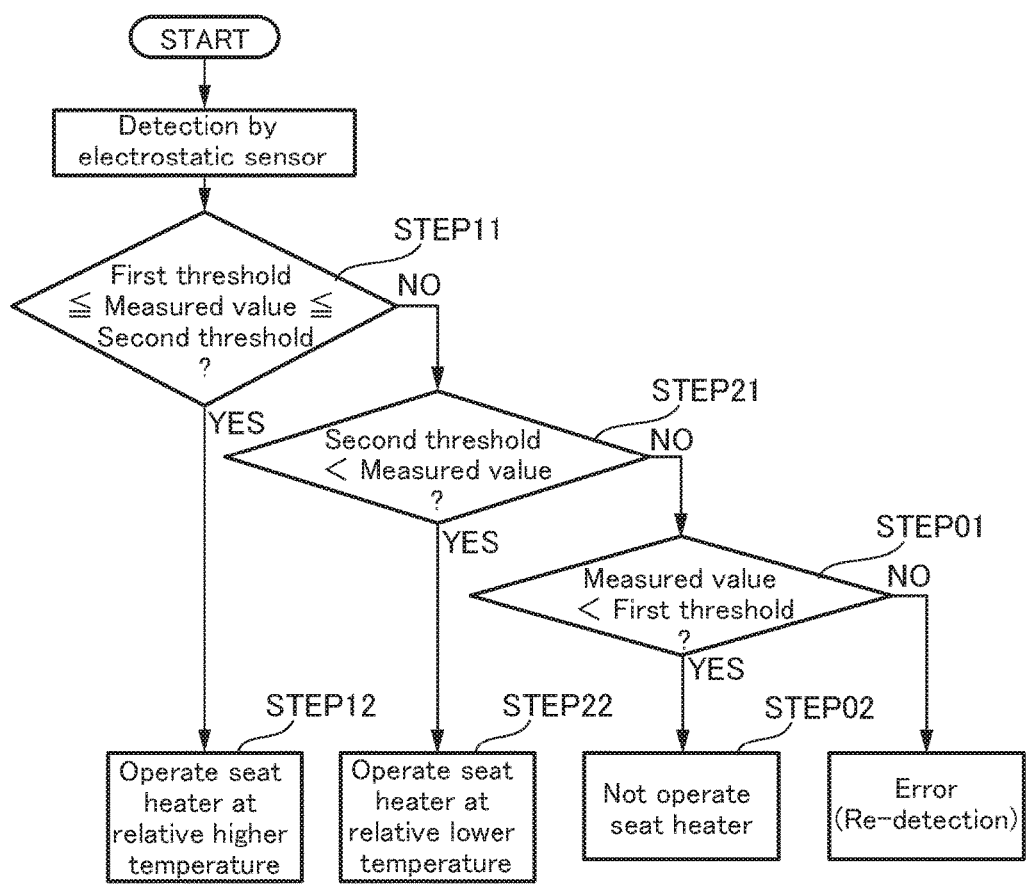
FIG. 2 is a schematic flowchart showing an example of operation of the seat heater control device shown in FIG. 1.

Next, an operation of the occupant detection device of the present embodiment is explained with reference to FIG. 2. FIG. 2 is a schematic flowchart showing an example of operation of the seat heater control device shown in FIG. 1.

As shown in FIG. 2, when the electrostatic sensor 11 detects a measured value higher than the predetermined first threshold and lower than the predetermined second threshold (STEP 11), it is likely that a passenger is sitting on the vehicle seat 13 and the passenger is a small and light person. That is to say, it is likely that the seat cushion of the vehicle seat 13 is compressed to a small extent. Thus, in this case, the controller 15 causes the seat heater 14 to operate at a relative higher temperature (STEP 12).

When the electrostatic sensor 11 detects a measured value higher than the predetermined second threshold (STEP 21), it is likely that a passenger is sitting on the vehicle seat 13 and the passenger is a big and heavy person. That is to say, it is likely that the seat cushion of the vehicle seat 13 is compressed to a large extent. Thus, in this case, the controller 15 causes the seat heater 14 to operate at a relative lower temperature (STEP 22).

When the electrostatic sensor 11 detects a measured value lower than the predetermined first threshold (STEP 01), it is likely that no passenger is sitting on the vehicle seat 13. Thus, in this case, the controller 15 causes the seat heater 14 not to operate (STEP 02).

According to the present embodiment, it is possible to control the output of the seat heater 14 effectively, by the adoption of the above operational manner.

Next, a more practical example of operation is explained with reference to FIG. 3. In the example shown in FIG. 3, the electrostatic sensor 11 serves as a distance measuring unit configured to measure a distance d between the sitting surface of the vehicle seat 13 and the seat heater 14 as well.

Specifically, for example, in advance, an experiment or the like is carried out, in which the distance is actively changed while the power supply to the seat heater 14 is continued, in order to obtain a relationship (table or equation) between respective distances and respective measured values of the capacitance. Then, when the distance is to be measured, based on the measured value of the capacitance, the corresponding distance is read out from the relationship (table or equation).

Figure 3:
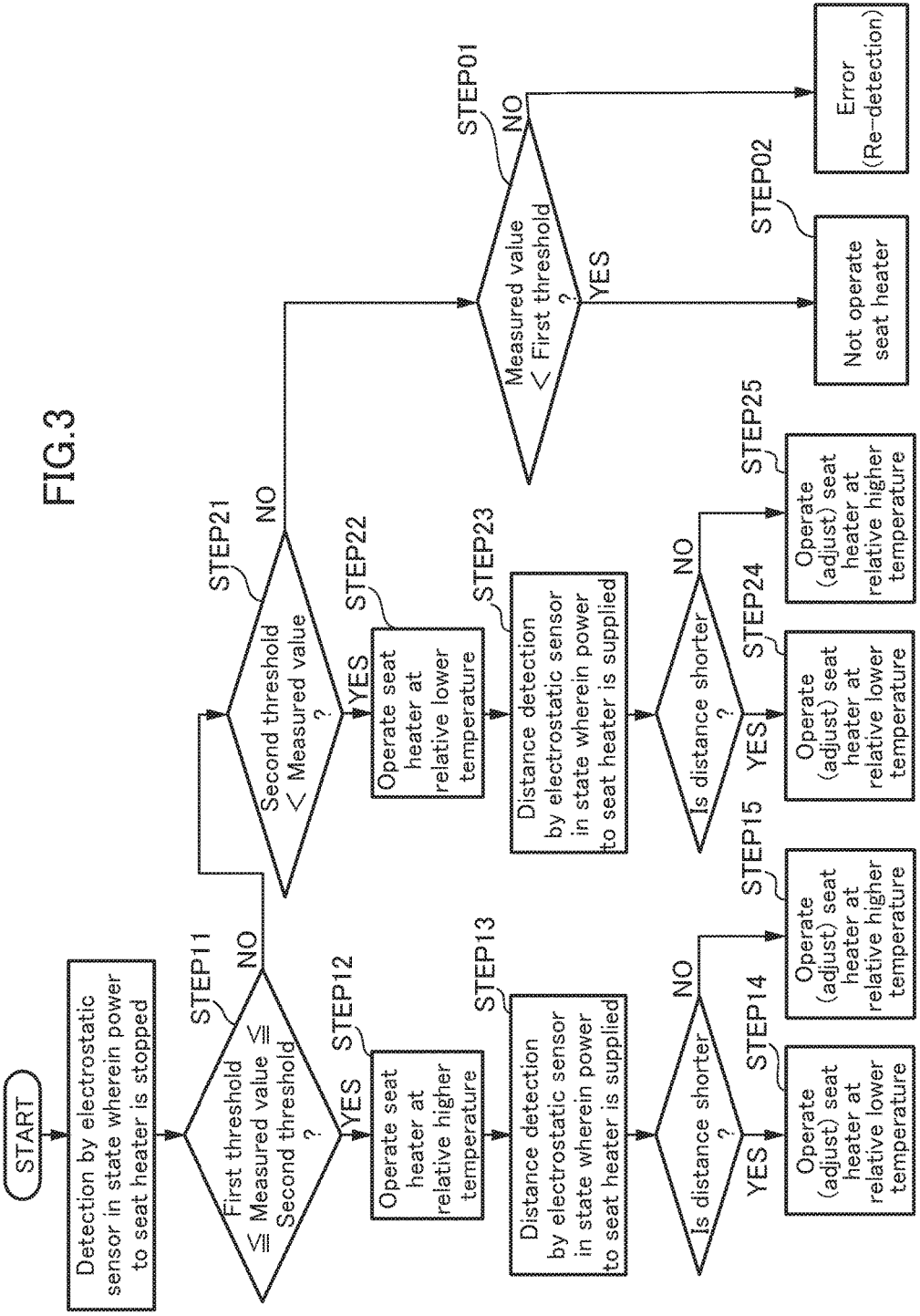
FIG. 3 is a schematic flowchart showing another example of operation of the seat heater control device shown in FIG. 1.
Figure 4:
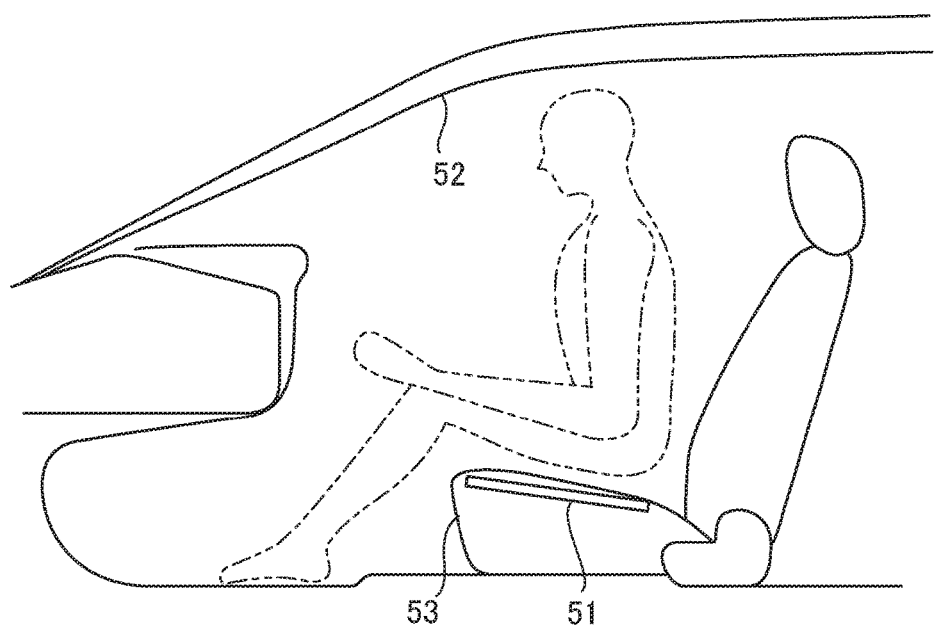
FIG. 4 is a schematic view showing a principle of an occupant detection device configured to detect whether or not there is a passenger using a capacitance sensor.

In the example shown in FIG. 3, the controller 15 adjusts the operational temperature of the seat heater 14, based on the distance information obtained from the electrostatic sensor 11. Specifically, when the distance is relatively short (when the seat cushion is made thinner to a large extent), the controller 15 causes the seat heater 14 to operate at a relative lower temperature. On the other hand, when the distance is relatively long (when the seat cushion is made thinner to a small extent), the controller 15 causes the seat heater 14 to operate at a relative higher temperature.

In the example shown in FIG. 3, the measurement by the electrostatic sensor 11 is made while the power supply to the seat heater 14 is stopped.

When the electrostatic sensor 11 detects a measured value higher than the predetermined first threshold and lower than the predetermined second threshold (STEP 11), it is likely that a passenger is sitting on the vehicle seat 13 and the passenger is a small and light person. That is to say, it is likely that the seat cushion of the vehicle seat 13 is compressed to a small extent. Thus, in this case, the controller 15 causes the seat heater 14 to operate at a relative higher temperature (STEP 12).

Furthermore, the power supply to the seat heater 14 is started, and the electrostatic sensor 11 measures the distance between the sitting surface of the vehicle seat 13 and the seat heater 14 (STEP 13).

Based on the distance information obtained from the electrostatic sensor 11, when the distance is relatively short (when the seat cushion is made thinner to a large extent), the controller 15 causes the seat heater 14 to operate at a relative lower temperature (STEP 14). On the other hand, when the distance is relatively long (when the seat cushion is made thinner to a small extent), the controller 15 causes the seat heater 14 to operate at a relative higher temperature (STEP 15).

When the electrostatic sensor 11 detects a measured value higher than the predetermined second threshold (STEP 21), it is likely that a passenger is sitting on the vehicle seat 13 and the passenger is a big and heavy person. That is to say, it is likely that the seat cushion of the vehicle seat 13 is compressed to a large extent. Thus, in this case, the controller 15 causes the seat heater 14 to operate at a relative lower temperature (STEP 22).

Furthermore, the power supply to the seat heater 14 is started, and the electrostatic sensor 11 measures the distance between the sitting surface of the vehicle seat 13 and the seat heater 14 (STEP 23).

Based on the distance information obtained from the electrostatic sensor 11, when the distance is relatively short (when the seat cushion is made thinner to a large extent), the controller 15 causes the seat heater 14 to operate at a relative lower temperature (STEP 14). On the other hand, when the distance is relatively long (when the seat cushion is made thinner to a small extent), the controller 15 causes the seat heater 14 to operate at a relative higher temperature (STEP 15).

When the electrostatic sensor 11 detects a measured value lower than the predetermined first threshold (STEP 01), it is likely that no passenger is sitting on the vehicle seat 13. Thus, in this case, the controller 15 causes the seat heater 14 not to operate (STEP 02).

According to the example of operation shown in FIG. 3, it is possible to control the output of the seat heater 14 more effectively.

What is claimed is:

1. A seat heater control device provided for a vehicle, the seat heater control device comprising:
    a vehicle seat that is provided inside a vehicle body of the vehicle;
    a seat heater that is provided inside of the vehicle seat;
    an electrostatic sensor provided in the vehicle seat and configured to measure capacitance between the electrostatic sensor and the vehicle body; and
    a controller that controls an operation and an operational temperature of the seat heater, based on a measured value of the electrostatic sensor;
    wherein
    in response to when the measured value of the electrostatic sensor is higher than a first threshold and lower than a second threshold, the controller enters into a light passenger mode corresponding with the passenger sitting on the vehicle seat and the passenger being relatively light, and, in the light passenger mode, operates the seat heater at a relative higher temperature, and
    in response to when the measured value of the electrostatic sensor is higher than the second threshold, the controller enters into a heavy passenger mode corresponding with the passenger sitting on the vehicle seat and the passenger being relatively heavy, and, in the heavy passenger mode, operates the seat heater at a relative lower temperature.

2. The seat heater control device according to claim 1, further comprising
    a distance measuring unit configured to measure a distance between a sitting surface of the vehicle seat and the seat heater,
    wherein
    the controller is configured to adjust the operational temperature of the seat heater based on a measurement value of the distance measuring unit.

3. The seat heater control device according to claim 2, wherein
    the electrostatic sensor is located in a vicinity of the sitting surface of the vehicle seat and also configured to serve as the distance measuring unit.

4. The seat heater control device according to claim 2, wherein
    in response to when the distance is relatively short, the controller enters into a short distance mode, and, in the short distance mode, causes the seat heater to operate at a relative lower temperature.

5. The seat heater control device according to claim 1, wherein
    in response to when the measured value is lower than the first threshold, the controller enters into a non-heating mode, and, in the non-heating mode, causes the seat heater not to operate.

6. A seat heater control device provided for a vehicle, the seat heater control device comprising:
- a vehicle seat that is provided inside a vehicle body of the vehicle;
- a seat heater that is provided inside of the vehicle seat;
- an electrostatic sensor provided in the vehicle seat and configured to measure capacitance between the electrostatic sensor and the vehicle body; and
- a controller that controls an operation and an operational temperature of the seat heater, based on a measured value of the electrostatic sensor;

wherein in response to when the measured value of the electrostatic sensor is lower than a threshold, the controller enters into a light passenger mode corresponding with the passenger sitting on the vehicle seat and the passenger being relatively light, and, in the light passenger mode, operates the seat heater at a relative higher temperature, and in response to when the measured value of the electrostatic sensor is higher than the threshold, the controller enters into a heavy passenger mode corresponding with the passenger sitting on the vehicle seat and the passenger being relatively heavy, and, in the heavy passenger mode, operates the seat heater at a relative lower temperature.

7. A seat heater control device provided for a vehicle, the seat heater control device comprising:
- a vehicle seat that is provided inside a vehicle body;
- a seat heater that is provided inside of the vehicle seat;
- an electrostatic sensor provided in the vehicle seat and configured to measure capacitance between the electrostatic sensor and the vehicle body; and
- a controller that controls an operation and an operational temperature of the seat heater, based on a measured value of the electrostatic sensor;

wherein in response to when the measured value of the electrostatic sensor is higher than a first threshold and lower than a second threshold, the controller enters into a small compression mode corresponding with the vehicle seat being compressed to a small extent, and, in the low compression mode, operates the seat heater at a relative higher temperature, and in response to when the measured value of the electrostatic sensor is higher than the second threshold, the controller enters into a large compression mode corresponding with the vehicle seat being compressed to a large extent, and, in the large compression mode, operates the seat heater at a relative lower temperature.

* * * * *